United States Patent
Izumi et al.

(10) Patent No.: US 10,784,503 B2
(45) Date of Patent: *Sep. 22, 2020

(54) PROTECTED LITHIUM ELECTRODE STRUCTURE FOR LITHIUM-AIR BATTERY

(71) Applicant: Suzuki Motor Corporation, Shizuoka-Ken (JP)

(72) Inventors: Hiroaki Izumi, Shizuoka-Ken (JP); Masaya Nomura, Shizuoka-Ken (JP); Hironari Minami, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 38 days.

This patent is subject to a terminal disclaimer.

(21) Appl. No.: 15/886,128

(22) Filed: Feb. 1, 2018

(65) Prior Publication Data
US 2018/0254474 A1  Sep. 6, 2018

(30) Foreign Application Priority Data

Mar. 1, 2017 (JP) ................................. 2017-038307

(51) Int. Cl.
*H01M 4/134* (2010.01)
*H01M 12/08* (2006.01)
(Continued)

(52) U.S. Cl.
CPC ............. *H01M 4/134* (2013.01); *H01M 4/64* (2013.01); *H01M 10/0525* (2013.01);
(Continued)

(58) Field of Classification Search
CPC ........ H01M 4/134; H01M 4/64; H01M 4/382; H01M 10/0525
See application file for complete search history.

(56) References Cited

U.S. PATENT DOCUMENTS

2007/0190416 A1\* 8/2007 Yamada ................ H01M 4/134
429/218.1
2011/0065009 A1  3/2011 Lascaud et al.
(Continued)

FOREIGN PATENT DOCUMENTS

CN  102027630 A  4/2011
CN  103066344 A  4/2013
(Continued)

OTHER PUBLICATIONS

Indian Examination Report for Application No. 201844002583 dated Oct. 10, 2019.
(Continued)

*Primary Examiner* — Jimmy Vo
(74) *Attorney, Agent, or Firm* — Lerner, David, Littenberg, Krumholz & Mentlik, LLP

(57) ABSTRACT

A protected lithium electrode structure for a lithium-air battery includes a negative electrode current collector, a negative electrode active material layer, which is made of a lithium metal, an alloy or a compound mainly containing lithium, which is stacked on the negative electrode current collector, and a separator stacked on the negative electrode active material layer. The negative electrode active material layer is sealed by the separator and the negative electrode current collector. A fine powder capturing layer for fine powder lithium metal produced during charging and discharging is provided between the negative electrode active material layer and the separator.

6 Claims, 4 Drawing Sheets

(51) Int. Cl.
*H01M 4/64* (2006.01)
*H01M 10/0525* (2010.01)
*H01M 4/38* (2006.01)
*H01M 4/02* (2006.01)

(52) U.S. Cl.
CPC ............ *H01M 12/08* (2013.01); *H01M 4/382* (2013.01); *H01M 2004/027* (2013.01); *H01M 2004/028* (2013.01); *Y02E 60/128* (2013.01)

(56) References Cited

U.S. PATENT DOCUMENTS

| | | | |
|---|---|---|---|
| 2011/0065099 A1 | 3/2011 | Ohshiro et al. | |
| 2012/0183880 A1* | 7/2012 | Toussaint | H01M 2/0207 429/481 |
| 2015/0372358 A1* | 12/2015 | Izumi | H01M 12/08 429/405 |
| 2016/0254514 A1 | 9/2016 | Roumi | |
| 2016/0261013 A1 | 9/2016 | Hase et al. | |

FOREIGN PATENT DOCUMENTS

| | | |
|---|---|---|
| CN | 103403922 A | 11/2013 |
| CN | 104350631 A | 2/2015 |
| CN | 104659375 A | 5/2015 |
| CN | 104659443 A | 5/2015 |
| JP | H01239761 A | 9/1989 |
| JP | 2010192313 A | 9/2010 |
| JP | 2016162686 A | 9/2016 |
| WO | 2012087698 A1 | 6/2012 |
| WO | 2013154623 A1 | 10/2013 |
| WO | 2016177401 A1 | 11/2016 |

OTHER PUBLICATIONS

Search Report from Chinese Office Action for Application No. 2018101724009 dated Jul. 24, 2020; 2 pages.
Search Report from German Examination Report for Application No. 102018104635.9 dated Jul. 21, 2020; 1 page.

* cited by examiner

PROTECTED LITHIUM ELECTRODE STRUCTURE FOR LITHIUM-AIR BATTERY

CROSS-REFERENCE TO RELATED APPLICATIONS

This application claims priority from Japanese Patent Application No. 2017-038307, filed Mar. 1, 2017, the disclosure of which is hereby incorporated herein by reference.

BACKGROUND OF THE INVENTION

The present invention relates to a protected lithium electrode structure used for a lithium-air battery.

Metal-air batteries have recently been proposed as next generation batteries capable of having an energy density higher than that of conventional lithium ion batteries. A metal-air battery is a battery with a negative electrode active material which is a metal and a positive electrode active material which is atmospheric oxygen. In addition, this metal-air battery using a lithium metal as the negative electrode active material is particularly receiving attention because the battery is said to theoretically generate more energy per unit weight. Such a metal-air battery which uses a lithium metal as the metal negative electrode active material is called a "lithium-air battery".

The lithium-air batteries are generally classified into two types: one in which an aqueous electrolyte is used inside, and another in which a non-aqueous electrolyte is used inside. The lithium-air battery which uses an aqueous electrolyte has an advantage in that it is less affected by moisture in the air than one which uses a non-aqueous electrolyte. Note that it is necessary to isolate a lithium metal used for the negative electrode active material from the atmosphere and the aqueous solution because the lithium metal chemically reacts with oxygen and water when coming into contact therewith. For the purpose of this isolation, a method has been proposed providing e.g. a lithium ion-conductive solid electrolyte as an isolation layer.

For example, as a lithium-air battery which uses an aqueous electrolyte, JP 2010-192313 A discloses a lithium-air battery including a protected lithium electrode in which a buffer layer of polymer electrolyte is formed on one surface of a plate-shaped lithium metal, and is covered with a lithium ion-conductive glass ceramic.

BRIEF SUMMARY OF THE INVENTION

When the lithium-air battery as disclosed in JP 2010-192313 A is put into practical use, the lithium metal used as the negative electrode active material is set as a metal (negative electrode current collector) serving as the negative electrode terminal. There may be a case in which, when the lithium-air battery with such a structure is charged and discharged several times, dendrites of lithium metal are deposited on a portion (back surface, for example) of the negative electrode terminal during charging. Moreover, there may be a case in which, when a tip end of a dendrite breaks off, fine lithium powder (dead lithium) is produced and is dispersed in the electrolyte solution. This dispersed lithium powder does not contribute to the charging and discharging because it floats away from the negative electrode terminal. As a result, the charging and discharging performance of the lithium-air battery gradually decreases as the dead lithium increases.

In light of the above circumstances, an object of the present invention is to provide a protected lithium electrode structure used for a lithium-air battery, the charging and discharging performance of which are less likely to deteriorate.

To achieve the above object, a protected lithium electrode structure for a lithium-air battery, according to an aspect of the present invention, includes: a negative electrode current collector; a negative electrode active material layer which is made of a lithium metal, an alloy mainly containing lithium, or a compound mainly containing lithium and which is stacked on the negative electrode current collector; and a separator stacked on the negative electrode active material layer, in which the negative electrode active material layer is sealed by the separator and the negative electrode current collector, and a fine powder lithium capturing layer which captures fine powder lithium metal produced during charging and discharging provided between the negative electrode active material layer and the separator. Note that the separator may be, for example, a porous resin sheet or the like.

The present invention includes: a negative electrode current collector; a negative electrode active material layer which is a lithium metal, an alloy mainly containing lithium, or a compound mainly containing lithium and which is stacked on the negative electrode current collector; and a separator stacked on the negative electrode active material layer, in which the negative electrode active material layer is sealed by the separator and the negative electrode current collector, and a fine powder lithium capturing layer which captures fine powder lithium metal produced during charging and discharging provided between the negative electrode active material layer and the separator. For this reason, it is possible to confine the fine powder lithium metal produced during charging and discharging in the fine powder lithium capturing layer. This makes it possible to obtain more lithium metal which contributes to charging and discharging and to enhance the use rate of the lithium metal because the fine powder lithium metal can be prevented from dispersing in the electrolyte solution. Hence, the charging and discharging performance does not easily decrease and charging and discharging over multiple times are possible. As a result, the charging and discharging property can be improved.

BRIEF DESCRIPTION OF THE DRAWINGS

FIG. 5A is a plan view of the negative electrode; and FIG. 5B is a plan view illustrating a state where a bag-shaped separator for storing the negative electrode is spread.

DETAILED DESCRIPTION

Hereinafter, with reference to the attached drawings, a description is provided for embodiments of a protected lithium electrode structure for a lithium-air battery according to the present invention in a detailed and specific manner.

Figure 1:
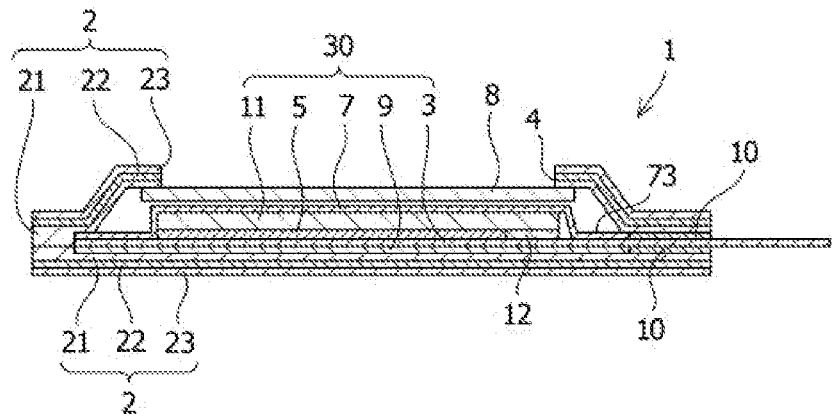
FIG. 1 is a cross-sectional view illustrating a protected lithium electrode of a lithium-air battery according to a first embodiment.

First, a description is provided for a protected lithium electrode structure for a lithium-air battery according to a first embodiment using FIG. 1. As illustrated in FIG. 1, a protected lithium electrode 1 of the lithium-air battery according to the first embodiment has a stack structure in which upper and lower metal foil laminate films 2, 2 sandwich a negative electrode 30 and a solid electrolyte 8 for isolating the negative electrode from e.g. moisture. The metal foil laminate film 2 on the upper side in the figure is a sheet in which three layers are stacked in the order of a resin layer 21 such as a heat sealable PP resin sheet, a metal foil layer 22, and a resin layer 23 such as a thermally resistant PET resin sheet from the inside (lower side in the figure) toward the outside (upper side in the figure). In the same manner, the metal foil laminate film 2 on the lower side in the figure is a sheet in which three layers are stacked in the order of the resin layer 21, the metal foil layer 22, and the resin layer 23 from the inside (upper side in the figure) toward the outside (lower side in the figure).

The metal foil laminate film 2 on the upper side in FIG. 1 has an opening portion 4 provided at the center or substantially at the center. This opening portion 4 is a quadrangle when viewed from the upper side in the figure. In addition, the solid electrolyte 8 for isolating the negative electrode formed of e.g. a glass ceramic from e.g. moisture is provided on the lower side of the opening portion 4 of the metal foil laminate film 2. The solid electrolyte 8 mentioned here refers to a solid substance which, when a voltage is applied thereto, allows permeation of ions (lithium ions). In the embodiment, this solid electrolyte 8 has a relatively thin plate shape. What is more, the size of the upper surface of this solid electrolyte 8 is slightly greater than the opening portion 4 of the metal foil laminate film 2.

Figure 2:
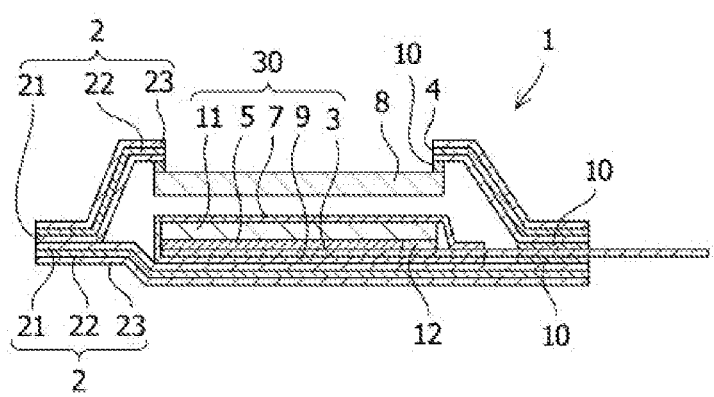
FIG. 2 is an enlarged view of a cross-section illustrating an enlarged protected lithium electrode of the lithium-air battery according to the first embodiment.

A peripheral edge portion of the opening portion 4 of the upper metal foil laminate film 2 is welded directly to the upper surface of the solid electrolyte 8, or preferably with a heat-sealing material 10 in between (see FIG. 2). Thus, the solid electrolyte 8 closes this opening portion 4. The closed opening portion 4 makes it possible to improve safety by reducing the reactivity of the highly reactive lithium powder produced by the charging and discharging, so that when water or the like enters the inside of the negative electrode when the lithium-air battery is damaged, the water or the like cannot rapidly enter the inside of the negative electrode.

The negative electrode 30 is provided below the solid electrolyte 8 in FIG. 1. This negative electrode 30 is fixed by welding both ends of each of the four sides in the figure which are sandwiched by the upper and lower metal foil laminate films 2. In addition, the upper and lower metal foil laminate films 2 are welded at corresponding upper and lower positions of the negative electrode with the heat-sealing materials 10, 10 in between.

Figure 3:
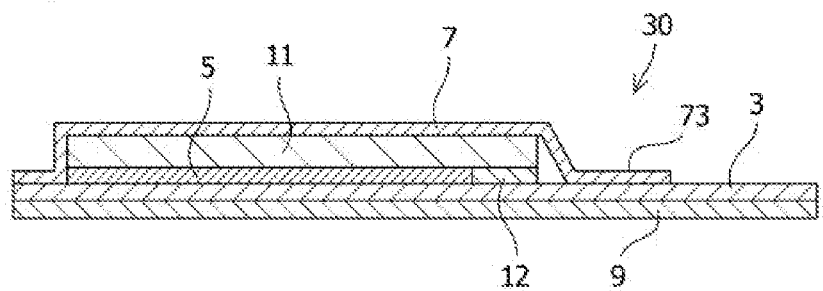
FIG. 3 is an enlarged view of a cross-section illustrating a negative electrode of the lithium-air battery according to the first embodiment.

FIG. 2 illustrates the protected lithium electrode 1 of FIG. 1 in an enlarged manner, and FIG. 3 illustrates the negative electrode 30 in FIG. 1 in an enlarged manner. As illustrated in FIG. 1 to FIG. 3, the negative electrode 30 has a structure in which five layers are stacked in the order of a film 9, a copper foil negative electrode current collector 3, a negative electrode active material layer 5 made of lithium metal, a fine powder lithium capturing layer 11 which captures fine powder lithium metal produced during the charging and discharging, as will be described later, and a separator 7 from the lower side toward the upper side in the figure. Here, the film 9 is a film of e.g. polypropylene resin and covers the lower surface of the negative electrode current collector 3 by weld joining. Note that the negative electrode active material layer 5 is sealed by the negative electrode current collector 3 and the separator 7, although this is not shown in FIG. 1 and FIG. 2, because they are cross-sectional views. Details of this structure are described later.

The fine powder lithium capturing layer 11 is, for example, a conductive foam or a formed body of metal fiber (metal wool such as copper having conductivity, or a felt-like formed body or fabric). Here, wool processed in the shape of a sheet having a fiber diameter of 0.02 mm or less and a thickness of 2 mm or less is desirable as metal wool of conductive material such as copper wool.

Here, if the fiber diameter of the formed body of metal fiber is greater than 0.02 mm, the surface of each fiber of the formed body of metal fiber is considered to be a reaction field of the Li deposition reaction. For this reason, if the fiber diameter decreases, the number of reaction fields increases, resulting in an insufficient effect by the formed body of metal fiber. If the fiber diameter increases, the weight and volume of the formed body of metal fiber increase, affecting size reduction and weight reduction of the battery (energy density).

In addition, if the thickness of the formed body of metal fiber is greater than 2 mm, the following problem occurs. Since this structure is a structure in which the entire Li metal negative electrode including the formed body of metal fiber is covered with the bag-shaped separator 7, it is necessary to increase the size of the bag-shaped separator 7 if the thickness of the formed body exceeds 2 mm. Moreover, if the formed body of metal fiber has the same fiber diameter and weight but a different thickness, the porosity inside the formed body of metal fiber is high. In this case, if the size of the separator 7 is large (the space inside the bag is large) and the porosity of the formed body of metal fiber is large, bubbles are caught in the inside of the protected lithium electrode, which needs to be filled with an organic electrolyte solution, causing an increase in the internal resistance.

The fine powder lithium capturing layer 11 may be a felted sheet subjected to defibration into wool followed by needling processing, rather than a porous metal sheet or a wool-like metal sheet entangled with conductive fine metal fibers. The same material as that of the negative electrode current collector is preferably used, but the material may be different as long as the battery operates without a problem within the operating range of the battery.

Here, if the conductive foam is used as the fine powder lithium capturing layer 11, there is an advantage in that the thickness of the foam sheet is easily controlled, the foam is filled with lithium during charging, and suppression of the increase in the thickness is possible, for example.

Furthermore, if the formed body of metal fiber (a wool-like, or felt-like formed body or fabric) is used as the fine powder lithium capturing layer 11, which has flexibility because it is fibrous, which is restored to the original state if bent (does not deform plastically), and which is a fine fiber, there are advantages in that, for example, the specific surface area is large, a conductive path is easily established, the amount of fiber is easily increased and decreased, the porosity is easily adjusted, and welding by e.g. a resistance welding machine is easily performed.

The separator 7 has a property that allows passing through of the electrolyte, described later, and conducts lithium ions. In addition, both left and right end surfaces in the figures of this separator 7 are bonded to the negative electrode current collector 3 (see FIG. 1 and FIG. 3). Moreover, the separator 7 is bonded to the negative electrode current collector 3 at four bonded portions 73 including an edge portion on the leader side in the figure and an edge portion on the back side in the figure. Thus, the negative electrode active material layer 5 is sealed at an unbonded portion 74 which is on the surface of the negative electrode current collector 3 and which is not bonded to the separator 7. Note that the size of the negative electrode active material layer 5 is the same as, or slightly smaller than, that of the unbonded portion 74. As illustrated in FIG. 1, this unbonded portion 74 is positioned at a location almost corresponding to the solid electrolyte 8 provided on the upper side in FIG. 1. Due to such a structure, the negative electrode active material layer 5 is isolated from the solid electrolyte 8 and is not in direct contact with the solid electrolyte 8. Note that a small amount of electrolyte (for example, a non-aqueous electrolyte solution, an organic electrolyte solution, or a polymer electrolyte) is sealed in the space between the negative electrode current collector 3 and the metal foil laminate film 2.

Moreover, the embodiment has a configuration in which the fine powder lithium capturing layer 11 is arranged on the negative electrode active material layer 5 and the negative electrode current collector 3 on the inner side of the separator 7, one of the edge portions is bonded to have electrical conductivity, and the negative electrode active material layer 5 is completely covered with the separator 7 from above. Thus, it is possible to confine the lithium powder formed into a fine powder by charging and discharging, between the separator 7 and the negative electrode current collector 3. While preventing direct contact between the solid electrolyte 8 and the negative electrode 30, this makes it possible to suppress dispersion and leakage inside the protected lithium electrode 1 of fine powdered lithium produced during the charging and discharging cycle, to reduce the fine powdered lithium which does not contribute to charging and discharging, to retard deterioration of the solid electrolyte 8, resulting in extension of the cell life and improvement of safety. Furthermore, when the fine powder lithium capturing layer 11 is bonded to have electrical conductivity inside the bag of the separator 7, it is possible to enhance the use rate of the fine powdered lithium metal produced by charging and discharging, to obtain more lithium which contributes to charging and discharging, and to improve a charging and discharging property thanks to these effects.

A description is now provided for the case in which the protected lithium electrode 1 in FIG. 1 is used for a lithium-air battery. In this case, an air electrode (not shown) is used which is installed above the solid electrolyte 8 in the figure. When the lithium-air battery using this protected lithium electrode 1 discharges, the negative electrode active material layer 5 (lithium metal) used for the negative electrode 30 divides into lithium ions ($Li^+$) and electrons ($e^-$), as illustrated in Chem. 1. Then, the lithium ions ($Li^+$) dissolve into the electrolyte solution, and the electrons ($e^-$) are supplied via an electron collecting part 31 of the negative electrode current collector 3 to a terminal portion 32. Hence, it is possible to control the design value of the battery capacity by changing the thickness and the area of the negative electrode active material layer 5.

$$Li \rightarrow Li^+ + e^- \qquad \text{Chem. 1}$$

In addition, the positive electrode (not shown) is supplied with electrons, where the ambient oxygen and water react with each other to produce hydroxide ions ($OH^-$) (Chem. 2). Further, these hydroxide ions ($OH^-$) react with lithium ions ($Li^+$) at the positive electrode to produce lithium hydroxide (LiOH).

$$O_2 + 2H_2O + 4e^- \rightarrow 4OH^- \qquad \text{Chem. 2}$$

On the other hand, when this lithium-air battery is charged, lithium ions supplied from the positive electrode pass through the solid electrolyte 8 and the separator 7 to reach the surface of the electron collecting part 31 of the negative electrode current collector 3 in the negative electrode 30, and the deposition reaction of the lithium metal takes place as a result (Chem. 3).

$$Li^+ + e^- \rightarrow Li \qquad \text{Chem. 3}$$

Here, as illustrated in FIG. 3, the separator 7 is bonded to the electron collecting part 31 at the bonded portions 73. For this reason, the surface of the electron collecting part 31 is not exposed at the bonded portions 73, and the deposition reaction of the lithium metal does not take place. Thus, the deposition reaction of the lithium metal takes place only in the unbonded portion 74 of FIG. 4.

Figure 4:
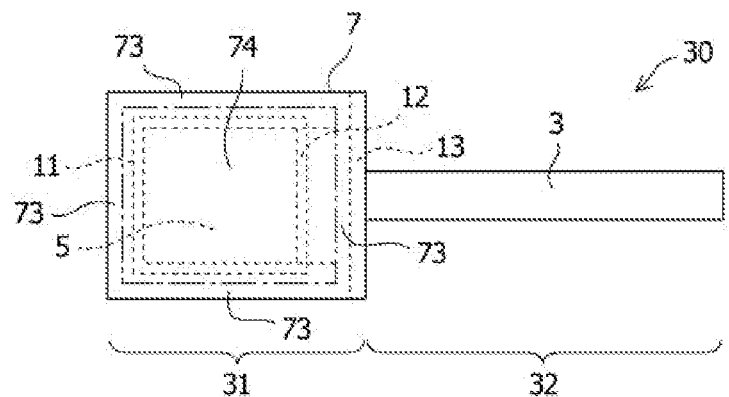
FIG. 4 is a plan view illustrating an example of the negative electrode of the lithium-air battery according to the first embodiment.

As illustrated in FIG. 4, the back surface of the electron collecting part 31 is covered with the film 9. For this reason, the electrolyte solution does not reach the back surface of the electron collecting part 31, and deposition reaction of the lithium metal does not take place as a result.

If the back surface of the electron collecting part 31 is not covered with the film 9 unlike the above, dendrite is deposited on this back surface. Fine lithium produced when tip ends of this dendrite break off is dispersed in the electrolyte solution. Since this dispersed fine lithium does not contribute to charging and discharging, the charging and discharging performance of the lithium-air battery decreases as a result.

As opposed to this, the protected lithium electrode structure according to the embodiment can provide a high performance lithium-air battery by suppressing the production of such dead lithium.

Meanwhile, at the positive electrode, an oxygen producing reaction indicated by Chem. 4 takes place.

$$4OH^- \rightarrow O_2 + 2H_2O + 4e^- \qquad \text{Chem. 4}$$

A description is hereinafter provided for the materials constituting the parts used for the first embodiment.

Polyolefin-based resins such as polypropylene resins and polyethylene resins can be used as the resin layer 21 in the metal foil laminate film 2. These resins have low melting points, are easily heat-processed, and suitable for heat sealing (thermal bonding), facilitating the manufacture of the protected lithium electrode 1.

Moreover, the metal foil laminate film 2 is provided with the metal foil layer 22 in order to improve the gas barrier property and the strength. It is possible to use metal foil such as aluminum foil, stainless steel foil, and copper foil for the metal foil layer 22.

Finally, as the resin layer 23, it is possible to use nylon-based resins and polyester-based resins such as polyethylene terephthalate resins. These resin materials are excellent in thermal resistance and strength. Thus, it is possible to improve the durability, the thermal resistance, the strength etc. of the protected lithium electrode 1.

Although the metal foil laminate film 2 has a three-layer structure in the first embodiment, the metal foil laminate film 2 may have a structure with four layers or more in which one or more resin films such as a nylon film are stacked between the layers.

For example, a glass ceramic, which is non-flammable and excellent in lithium ion-conductivity, can be used as the solid electrolyte 8. Particularly in the case in which an aqueous electrolyte solution is used as the electrolyte solution, it is possible to use an LATP-based glass ceramic electrolyte having high water resistance. The LATP is an oxide with an NASICON-type crystalline structure which includes e.g. Li, Ti, Al, P, Si, and O.

As the film 9, for example, it is possible to use a resin sheet such as polypropylene and polyethylene which is resistant to an electrolyte solution (organic electrolyte solution). Note that the film 9 is bonded on the entire back surface of the electron collecting part 31 of the negative electrode current collector 3. However, only the peripheral edge portions may be bonded. What is more, not only the back surface, but also the side surfaces (edge portions) of the negative electrode current collector 3, may be covered.

The separator 7 can be a sheet of cellulose or polyolefin-based resin such as porous polyethylene or polypropylene used as a separator for a lithium ion battery, for example. The materials include, other than these, aramid and polytetrafluoroethylene having a porous structure. One can use the above separator impregnated with e.g. an electrolyte solution (non-aqueous electrolyte solution, organic electrolyte solution) or a polymer electrolyte.

Additionally, it is possible to use the separator 7 with a porosity of about 40% to 90% and a thickness of about 10 to 300 μm, more preferably about 15 to 100 μm. The size of each pore may be about 20 nm to 500 nm, more preferably about 20 to 70 nm. Further, it is more preferable that the separator 7 itself have a certain degree of rigidity and strength.

As for the electrolyte solution, for example, as a non-aqueous electrolyte solution, it is possible to use a mixture solvent of carbonate ester-based organic solvent containing PC (propylene carbonate), EC (ethylene carbonate), DMC (dimethyl carbonate), or EMC (ethyl methyl carbonate), or an ether-based solvent such as ethylene glycol dimethyl ether, tetraethylene glycol dimethyl ether, and triethylene glycol dimethyl ether, added with an electrolyte such as $LiPF_6$ (lithium hexafluorophosphate), $LiClO_4$ (lithium perchlorate), $LiBF_4$ (lithium tetrafluoroborate), LiTFSI (lithium bis(trifluoromethanesulfonyl)imide), and LiFSI (lithium bis(fluorosulfonyl)imide). As for an aqueous electrolyte solution, for example, as a lithium salt to be dissolved into water, it is possible to use LiCl (lithium chloride), LiOH (lithium hydroxide), $LiNO_3$ (lithium nitrate), and $CH_3COOLi$ (lithium acetate), or a mixture solution thereof.

Note that the positive electrode (not shown) may be, for example, a catalytically active noble metal such as platinum, gold, iridium, or ruthenium, an oxide thereof, or a catalytically active metal oxide such as catalytically active manganese dioxide with a large specific surface area, mixed with an electric conductive agent such as highly conductive carbon and, as a binder, polyvinylidene fluoride, polytetrafluoroethylene, styrene-butadiene rubber, etc., and supported on an air electrode current collector having conductivity and a gas dispersion property. For example, as this air electrode current collector, it is possible to use carbon paper, carbon cloth, a carbon nonwoven fabric, titanium mesh, nickel mesh, copper mesh, stainless steel mesh, porous nickel (metal foam of nickel), and metal mesh in which a highly corrosion resistant metal such as nickel, titanium, or stainless steel is used. Note that the carbon cloth mentioned here refers to a cloth-like sheet woven with e.g. carbon fibers, and the carbon non-woven fabric indicates sheet-shaped carbon fibers randomly twined with one another. Note that if an aqueous electrolyte solution is used as the electrolyte solution, the air electrode current collector also needs to be corrosion resistant to the electrolyte solution. Thus, it is possible to preferably use e.g. carbon fibers which are high in conductivity, corrosion resistant to both acid and alkaline solutions, and light in weight.

FIG. 4 illustrates an example of the negative electrode 30 in the first embodiment and is a diagram of the negative electrode viewed from above in FIG. 2. The negative electrode current collector 3 includes the electron collecting part 31 positioned on the left side in the figure and the terminal portion 32 positioned on the right side in the figure. The electron collecting part 31 has the shape of a quadrangle with a larger area than that of the terminal portion 32. The electron collecting part 31 has the negative electrode active material layer 5 and the separator 7 stacked therein. In the negative electrode 30, foil of the negative electrode active material layer 5 which is a lithium metal and smaller than the area of the negative electrode current collector 3 is bonded on the negative electrode current collector 3 which has a structure where the electron collecting part 31 and the terminal portion 32 formed of e.g. copper foil are integrated. Furthermore, on the negative electrode active material layer 5, one edge portion of the fine powder lithium capturing layer 11 is bonded at a bonded portion 12 to one side of the negative electrode current collector by the resistance welding machine. Placed on this portion is the separator 7 which is a thermoplastic resin such as porous polyethylene or polypropylene often used in a lithium ion battery so as to cover these elements. The separator 7 is bonded by welding at the bonded portions 73 being the four sides of the peripheral edge portion, where the negative electrode active material layer 5 positioned on the surface of the negative electrode current collector 3 and the fine powder lithium capturing layer 11 are not arranged. Further, the back surface of the electron collecting part 31 of the negative electrode current collector 3 is entirely covered with the film 9 (see FIG. 1). This film 9 is also preferably a resin sheet which does not allow an electrolyte solution to pass through and is resistant to deterioration by an electrolyte solution, for example a resin sheet resistant to an organic electrolyte solution, such as polypropylene or polyethylene. In this example, the fine powder lithium capturing layer 11 is bonded to the copper foil of the negative electrode current collector 3 with e.g. a spot welder. This bonded portion is indicated with the reference sign 12 and is a portion where one edge portion of the fine powder lithium capturing layer 11 and the copper foil of the negative electrode current collector 3 are stacked on each other. Note that in FIG. 4, the reference sign 13 indicates a thermal bonding sheet used to thermally weld the separator 7 and the copper foil of the negative electrode current collector 3 together.

Figure 5A:
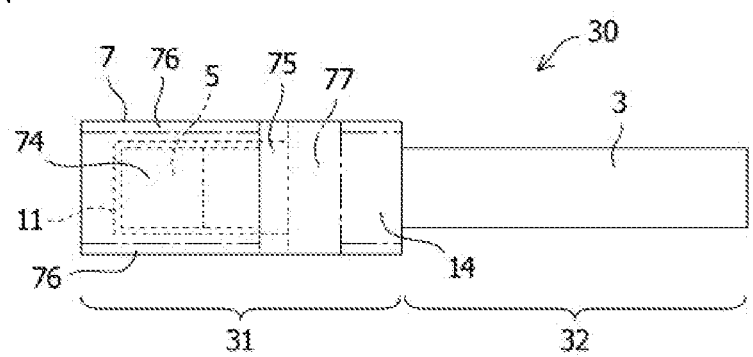
FIGS. 5A and 5B illustrate another example of the negative electrode of the lithium-air battery according to the first embodiment.
Figure 5B:
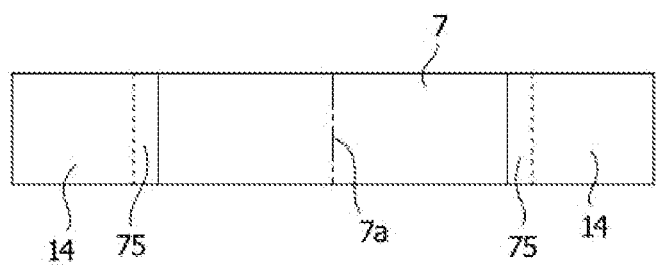

FIGS. 5A and 5B indicate another example of the negative electrode 30 in the first embodiment. In this example, the separator 7 has bonded portions 75 on both the ends, onto which portions of the thermal bonding sheets 14, 14 are placed and bonded, as illustrated in FIG. 5B. The negative electrode 30 illustrated in FIG. 5A is formed by: bending one separator 7 illustrated in FIG. 5B along a crease 7a near the center thereof to make a mountain fold; performing heat-sealing at the thermal bonding portions 76 being two peripheral edge portions to make the separator a bag; put a single unit of the negative electrode active material layer 5 and the negative electrode current collector 3 into the bag; and thereafter thermally welding the thermal bonding portions 76 together to close the bag, thermally welding the separator 7 to the copper foil of the negative electrode current collector 3, and bonding the thermal bonding sheets 14, 14 at the bonded portion 77 next to the bonded portion 75 to close the bag more tightly. In the negative electrode 30 having such a configuration, it is possible to obtain the same effects as those of the negative electrode 30 in FIG. 4. Note that the thermal bonding sheet which is interposed between the separator 7 and the copper foil of the negative electrode current collector 3 and is used to bond these elements is preferably an acid-modified polypropylene-based thermal bonding sheet.

Figure 6:
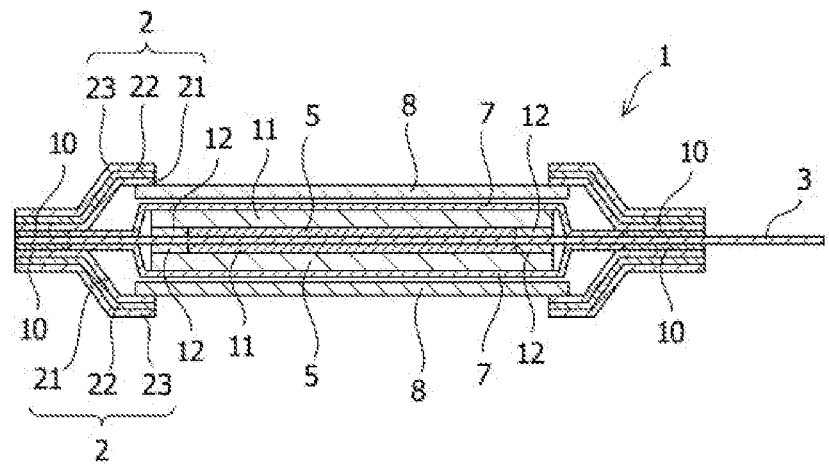
FIG. 6 is a cross-sectional view illustrating a protected lithium electrode of a lithium-air battery according to a second embodiment.

Using FIG. 6, a description is provided for a protected lithium electrode structure for a lithium-air battery according to a second embodiment. Note that since the second embodiment is a modification of the first embodiment illustrated in FIG. 1 to FIG. 4, repeated explanation is omitted and only the differences are explained.

A protected lithium electrode 1 illustrated in FIG. 6 has a configuration in which an opening portion 4 of a solid electrolyte 8 of the protected lithium electrode is provided on either side of the battery. The protected lithium electrode 1 in this second embodiment has a structure in which a negative electrode active material layer 5, a fine powder lithium capturing layer 11, a separator 7, a solid electrolyte, and a metal foil laminate film 2 are provided on either side, upper and lower, with a negative electrode current collector 3 as a boundary.

Such a structure makes it possible to omit a film 9 covering the back surface of the negative electrode current collector 3 and the metal foil laminate film 2 covering the back surface of the protected lithium electrode 1, and to reduce the volumes and the weights of the protected lithium electrode 1 and a lithium-air battery using the same compared to a structure in which the battery is sealed in a container with one surface of one air electrode facing one surface of one protected lithium electrode 1.

In addition, as opposed to the upper covering material of the opening portion 4 of the solid electrolyte 8 of the protected lithium electrode 1 (corresponding to the upper metal foil laminate film 2), the opposite side (corresponding to the lower metal foil laminate film 2) may have a structure in which the negative electrode active material layer 5 is bonded to a copper foil portion of a two-layered structure laminate film of copper foil/PET resin, and the negative electrode 30 is covered with the separator 7 being the porous resin sheet of the present proposition. This configuration makes it possible to provide the copper foil of the metal foil laminate film 2 being a covering material as the negative electrode current collector 3, and to reduce the number of parts and the thickness and the weight of the battery.

The above descriptions of the embodiments are examples for explaining the protected lithium electrode structure for the lithium-air battery according to the present invention and are not intended to limit the invention as claimed in the claims. Moreover, the configuration of each component of the present invention is not limited to the above-described embodiments and can be variously modified within the technical scope described in the claims.

For example, in the above-described embodiments, the fine powder lithium capturing layer 11, the negative electrode active material layer 5, the negative electrode current collector 3, the solid electrolyte 8, etc., need not be rectangular or square. The shape can be changed to a circular or polygonal one depending on the intended use. In addition, one protected lithium electrode need not be necessarily provided with one negative electrode active material layer 5, but may be provided with more than one negative electrode active material layer 5. Moreover, the protected lithium electrode need not be flat, but may be modified depending on the intended use. For example, the protected lithium electrode may be in a three-dimensional shape.

Note that the fine powder lithium capturing layer 11 may be a sheet formed like wool using the same material as that of the negative electrode current collector 3, for example copper, stainless steel, and Ni. There is a phenomenon in which when different metals are in contact with each other, the corrosion of one of the metals (the metal with higher ionization tendency) is promoted in general due to the difference in ionization tendency (galvanic corrosion). However, if both are of the same material, there is an advantage in that deterioration of the battery can be retarded because no galvanic corrosion occurs. Although it is necessary to bond the fine powder lithium capturing layer 11 and the negative electrode current collector 3 together by means of resistance welding, for example a spot welder in order to establish electrical conductivity, it is difficult to bond different metals together even by using such welding means. However, if the fine powder lithium capturing layer 11 and the negative electrode current collector 3 are of the same material, they are easily bonded because the above problem is eliminated. Thus, there is an advantage that productivity is improved.

Hereinafter, an example is shown below in which a charging and discharging experiment was carried out for the lithium-air battery adopting a protected lithium electrode structure 1 according to the first embodiment.

First, a description is provided for a protected lithium electrode 1 (see FIG. 1 and FIG. 7) used in Example 1, a positive electrode, and a method of fabricating a lithium-air battery using the same.

In this example, the metal foil laminate film 2 was used which includes the resin layer 21 made of a PP (polypropylene) resin, the metal foil layer 22 of Al (aluminum) foil, and the resin layer 23 of PET (polyethylene terephthalate) resin. An opening portion 4 was provided by punching a 2-centimeter-square hole in the center portion of this metal foil laminate film 2. Next, a punched acid-modified polypropylene film (outer peripheral portion: 3 centimeter square; inner periphery: 2 centimeter square), a 2.5-centimeter-square solid electrolyte 8 (LATP), and a punched acid-modified polypropylene film (outer peripheral portion: 3 centimeter square; inner periphery: 2 centimeter square) were stacked one on another in this order under the metal foil laminate film 2. Then, the four sides of the solid electrolyte 8 were heat sealed and bonded with a heat sealer so as to close the opening portion 4. Then, an adhesive sheet (punched acid-modified polypropylene film (outer peripheral portion: 3 centimeter square; inner periphery: 2 centimeter square)) was inserted between each two of the layers, and the four sides of the solid electrolyte 8 were heat sealed and bonded to the metal foil laminate film 2 with a heat sealer.

Meanwhile, the negative electrode 30 (see FIG. 3) was fabricated inside a glovebox under an argon atmosphere.

Figure 7:
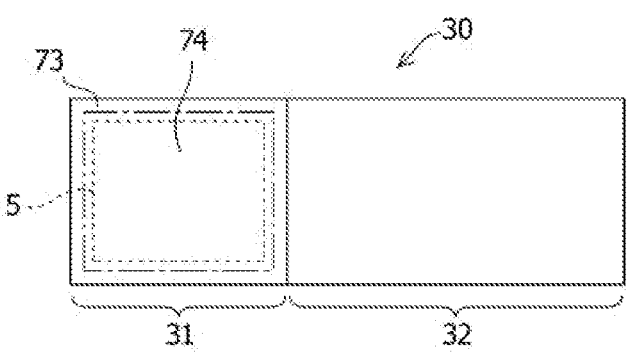
FIG. 7 is a plan view illustrating a negative electrode of a lithium-air battery according to Example 1.
Figure 8:
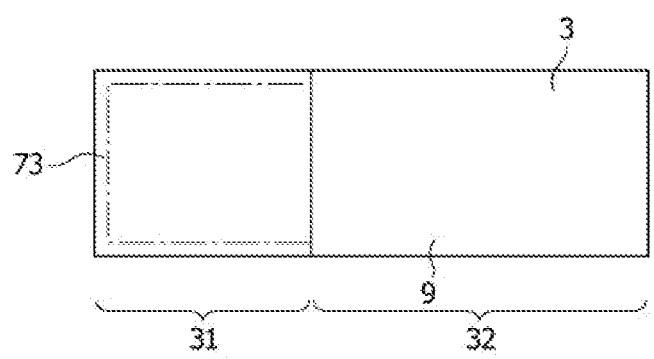
FIG. 8 is a bottom view illustrating the negative electrode of the lithium-air battery according to Example 1.

First, a negative electrode current collector 3 (copper foil thickness: 10 μm; current collector size: 3 cm×7 cm) was prepared in which an acid-modified polypropylene film was bonded to the back surface. Then, a copper wool fine powder lithium capturing layer 11 (processed into the shape of a sheet with size: 1.45 cm×2 cm; fiber diameter: 0.02 mm or less; and thickness: 2 mm or less) was stacked on a surface center portion of a 3-centimeter-square portion of the tip end portion. The edge portion on the terminal side of the negative electrode current collector 3 and one side of the fine powder lithium capturing layer 11 were bonded with a micro spot welder, which was then covered with a polypropylene resin separator 7 for a lithium ion battery. The four sides of the edge portions were thermally sealed and bonded to a portion where polypropylene of the back surface of the negative electrode current collector 3 was bonded, and thus, the negative electrode 30 was integrally formed (FIG. 7 and FIG. 8). Note that in FIG. 1 to FIG. 3 and FIG. 6, the reference sign 12 indicates a bonded portion where the fine powder lithium capturing layer 11 and the copper foil of the negative electrode current collector 3 are welded with e.g. a spot welder.

The upper metal foil laminate film 2, the negative electrode 30, and the lower metal foil laminate film 2 (without the solid electrolyte opening portion 4) were stacked one on another so that the solid electrolyte 8 and the negative electrode active material layer 5 on the negative electrode current collector 3 were located at the corresponding positions. Then, three sides of the peripheral portion were heat sealed and bonded with a heat sealer. Furthermore, 1 ml of non-aqueous electrolyte solution (4M (mol/l) LiFSI/EGDME) was injected via the remaining unbonded side into the inside of the protected lithium electrode. Thereafter, after the inside gas was let out, the remaining side of the edge portion (terminal portion 32 of the negative electrode current collector 3) was finally bonded with a heat sealer and closed. Thus, the protected lithium electrode 1 in FIG. 3 was fabricated.

Note that LATP (LICGC manufactured by OHARA INC.) was used as the solid electrolyte. Besides, the used separator for the lithium ion battery was made of a polypropylene resin and had a thickness of 25 μm, an average pore diameter of 0.03 μm or less, a porosity of 44%, and a permeability of 450 sec/100 cc.

Next, a positive electrode (not illustrated) was fabricated. First, 0.8 g of $MnO_2$ (specific surface area of about 300 $m^2/g$) as a positive electrode catalyst, 0.1 g of Ketjenblack (specific surface area of about 800 $m^2/g$) as an electric conductive agent, and 0.1 g of polytetrafluoroethylene (PTFE) as a binder were prepared. These, added with 5 ml of ethanol being a dispersant, were mixed in an agate mortar to create a positive electrode material.

Then, the positive electrode material was divided in two equal portions, which were arranged on both surfaces of a compression bond portion of Ti mesh integrally having a unit of a 2.5×2.5 $cm^2$ compression bond portion and a 1×5.5 $cm^2$ terminal portion, then compression bonded with a force of 20 kN. The resultant product was naturally dried for 24 hours to prepare a positive electrode structure. Thereafter, a lithium-air battery was fabricated with the protected lithium electrode 1 and the positive electrode facing each other. The aqueous electrolyte solution on the positive electrode side used was a mixture liquid of LiOH and LiCl. Prepared was an aqueous electrolyte solution in which 1.5 M (mol/L) of LiOH aqueous solution and 10 M (mol/L) of LiCl aqueous solution were mixed in a ratio of 1:1 so that the pH was 10 or less. Note that in order to retain the aqueous electrolyte solution, 1.5 ml of the solution was dropped onto the 3-centimeter-square polyacrylamide sheet and was arranged between the protected lithium electrode 1 and the positive electrode.

Figure 9:
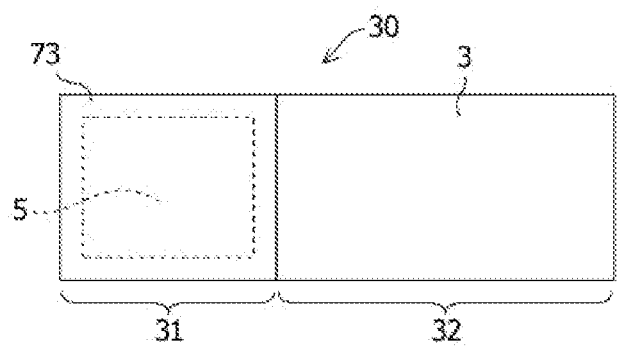
FIG. 9 is a plan view illustrating a negative electrode used to make a performance comparison with the negative electrode depicted in FIG. 7 and FIG. 8.
Figure 10:
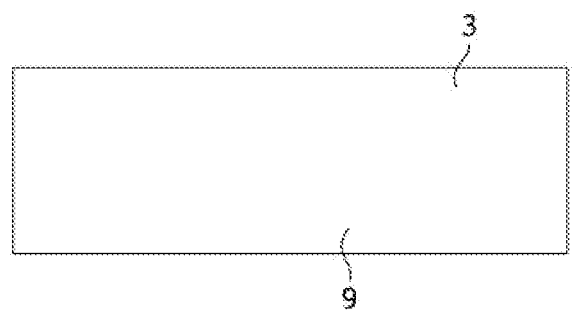
FIG. 10 is a bottom view illustrating the negative electrode used to make a performance comparison with the negative electrode depicted in FIG. 7 and FIG. 8.

FIG. 9 and FIG. 10 illustrate a negative electrode 30 used to make performance comparisons with the negative electrode 30 illustrated in FIG. 7 and FIG. 8. FIG. 9 is a plan view and FIG. 10 is a bottom view of the negative electrode 30. As for the negative electrode 30 illustrated in FIG. 9 and FIG. 10, the elements having the same functions as those illustrated in FIG. 7 and FIG. 8 are given the same reference signs, and repetitive explanation is omitted. The negative electrode 30 illustrated in FIG. 9 and FIG. 10 differs from the negative electrode 30 illustrated in FIG. 7 and FIG. 8 only in that it does not include the fine powder lithium capturing layer 11.

Figure 11:
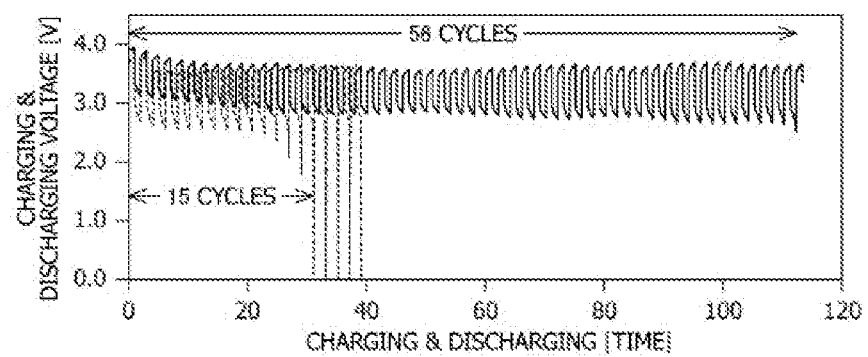
FIG. 11 is a graph illustrating a relationship between time and a charging and discharging voltage of the lithium-air battery according to Example 1.

Next, a description is provided for a discharging and charging test in Example 1. First, the lithium-air battery fabricated as described above was charged for five hours at 4 mA (which corresponds to a current density of 2 $mA/cm^2$ in terms of the area of copper wool) to be adjusted to a negative electrode capacity corresponding to 20 mAh. FIG. 11 illustrates a result of the change in voltage at temperature of 25° C. when charging and discharging were repeated for one hour at 4 mA (which corresponds to a current density of 2 $mA/cm^2$ in terms of the area of copper wool), the same value as above, which was measured with HJ1001SD8 manufactured by Hokuto Denko Corporation. Consequently, discharging was stopped at fifteenth cycle in the comparative example illustrated in FIG. 9 and FIG. 10, while on the other hand charging and discharging continued for 56 cycles in Example 1 illustrated in FIG. 7 and FIG. 8, which means that the charging and discharging cycle property was improved.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

REFERENCE SIGNS LIST 1 protected lithium electrode
2 metal foil laminate film
3 negative electrode current collector
4 opening portion
5 negative electrode active material layer
7 separator
8 solid electrolyte
9 film
10 heat-sealing material (thermal bonding sheet)
11 fine powder lithium capturing layer
12 bonded portion
13 heat-sealing material (thermal bonding sheet)
14 heat-sealing material (thermal bonding sheet)
21 resin layer
22 metal foil layer
23 resin layer
24 resin layer
30 negative electrode
31 electron collecting part
32 terminal portion
73 bonded portion 74 unbonded portion
75 bonded portion
76 thermal bonding portion
77 bonded portion

The invention claimed is:

1. A protected lithium electrode structure for a lithium-air battery, comprising:
 a negative electrode current collector;
 a negative electrode active material layer which is made of a lithium metal, an ahoy mainly containing lithium, or a compound mainly containing lithium and which is stacked on the negative electrode current collector; and
 a separator stacked on the negative electrode active material layer, wherein the negative electrode active material layer is sealed by the separator and the negative electrode current collector, and
 a fine powder lithium capturing layer provided between the negative electrode active material layer and the separator, wherein the fine powder lithium capturing layer is bonded directly to the negative electrode current collector to establish electrical conductivity fine powder lithium capturing layer, and the fine powder lithium capturing layer being a conductive foam or a formed body of metal fiber.

2. The protected lithium electrode structure for a lithium-air battery according to claim 1, wherein the fine powder lithium capturing layer is made of the same material as that of the negative electrode current collector.

3. The protected lithium electrode structure for a lithium-air battery according to claim 1, wherein the formed body of metal fiber is a wool-like or felt-like formed body or fabric.

4. The protected lithium electrode structure for a lithium-air battery according to claim 1, wherein the separator is bonded to the negative electrode current collector at a peripheral edge portion of the negative electrode active material layer.

5. The protected lithium electrode structure for a lithium-air battery according to claim 1, wherein the negative electrode current collector is foil or plate-shaped,
 the negative electrode active material layer is arranged on one surface of the negative electrode current collector, and
 another surface of the negative electrode current collector is covered with a substance with lithium ion non-conductance.

6. The protected lithium electrode structure for a lithium-air battery according to claim 1, wherein the negative electrode active material layer is stacked on a surface of the negative electrode current collector so as to cover an area smaller than an area of the negative electrode current collector.

* * * * *